United States Patent [19]

Huey-Jeng

[11] Patent Number: 4,906,977

[45] Date of Patent: Mar. 6, 1990

[54] PRESSURE GAUGE WITH NEEDLE ACTUATED ALARM

[76] Inventor: Jong Huey-Jeng, No. 28-5, Sheh Dou Rd., Zen Yea Village, Sheh Tou Shian, Jang Hwa Hsien, Taiwan

[21] Appl. No.: 224,149

[22] Filed: Jul. 26, 1988

[51] Int. Cl.[4] .............................................. G08B 21/00
[52] U.S. Cl. .................................... 340/626; 340/693; 340/688; 200/56 R; 137/557
[58] Field of Search ................. 73/700, 709, 710, 717, 73/719, 720, 722, 725, 726, 728, 732, 734, 740, 733, 509; 116/70, 270, 273, 274, 293, 296, 297, 284; 200/61.41, 56 R; 340/626, 688, 693, 678; 307/118; 324/157; 137/553, 554, 557

[56] References Cited

U.S. PATENT DOCUMENTS

| | | | |
|---|---|---|---|
| 1,118,742 | 11/1914 | Cole | 200/56 R |
| 2,715,165 | 8/1955 | Matter | 200/61.41 |
| 3,016,038 | 1/1962 | Stiens | 116/296 |
| 3,678,758 | 7/1972 | Lawrence | 73/733 |
| 4,536,756 | 8/1985 | DePasquale et al. | 340/693 |
| 4,613,851 | 9/1986 | Hines | 310/626 |

FOREIGN PATENT DOCUMENTS

| | | | |
|---|---|---|---|
| 2122342 | 11/1972 | Fed. Rep. of Germany | 200/56 R |
| 0579959 | 8/1946 | United Kingdom | 73/709 |

*Primary Examiner*—Joseph A. Orsino
*Assistant Examiner*—Jill D. Jackson
*Attorney, Agent, or Firm*—Larson and Taylor

[57] ABSTRACT

A pressure gauge has a turning button, a turning disc and a sliding block disposed thereon that, through a protruding wheel fixed on the needle shaft moves the sliding block to force a contact point of a conducting metal piece to contact with a contact point of the turning disc, can start an alarm in case the needle of the gauge comes to reach the designated pressure.

1 Claim, 3 Drawing Sheets

4,906,977

PRESSURE GAUGE WITH NEEDLE ACTUATED ALARM

BACKGROUND OF THE INVENTION

This invention concerns a pressure gauge with an alarm device, which can give out an alarm electrically in case the pressure surpasses the designated one, warning the workers responsible for the equipment. As traditional pressure gauges are not usually provided with an alarm device so that worker often cannot find out the over-pressure because of carelessness or something even though the gauge shows an abnormally higher pressure.

SUMMARY OF THE INVENTION

This invention aims to provide a pressure gauge which can give out an alarm to alert the workers responsible for the equipment and cut off the electricity if necessary when the pressure surpasses the normal point.

This pressure gauge with an alarm device includes a protruding wheel set on the shaft of the needle of the gauge, a turning disc provided with an alarming needle and pointing to the pressure graduation as the gauge needle does, and a sliding block has a square frame which is set and can be moved straight on a rail provided at the bottom of the turning disc by the protruding wheel set on the shaft of the needle of the gauge. The sliding block is also provided with a bolt and a nut to connect with a conducting metal piece having a contact point respectively at both ends, and two inner protrusions inside the block and one outer protrusion outside the block. The protruding wheel is set inserted in the interior of the sliding block and whereby said block can be moved straight by the turning of said wheel by means of the two inner protrusions and the fan-shaped portion of said wheel. Then the conducting metal piece can be bended by the pushing of the outer protrusion or the nut either leftward or rightward; if it bends leftward, one contact point of said metal piece can contact with one contact point of the turning disc to start an alarm for warning that the pressure has reached the designated point; if it bends rightward another contact point of said metal piece can contact with another contact point of the turning disc for starting electricity for another purpose.

A turning buttom combined with the turning disc and also assembled with a shell disc can be revolved to turn the turning disc and its alarming needle to point to a designated pressure for starting an alarm in case the needle of the gauge comes to reach the designated pressure previously set by the turning button. The shell disc of a transparent material assembles the turning button and the turning disc with the gauge body.

BRIEF DESCRIPTION OF THE DRAWINGS

This invention will now be described in detail with reference to accompanying drawings wherein.

DETAILED DESCRIPTION OF THE INVENTION

Figure 1:
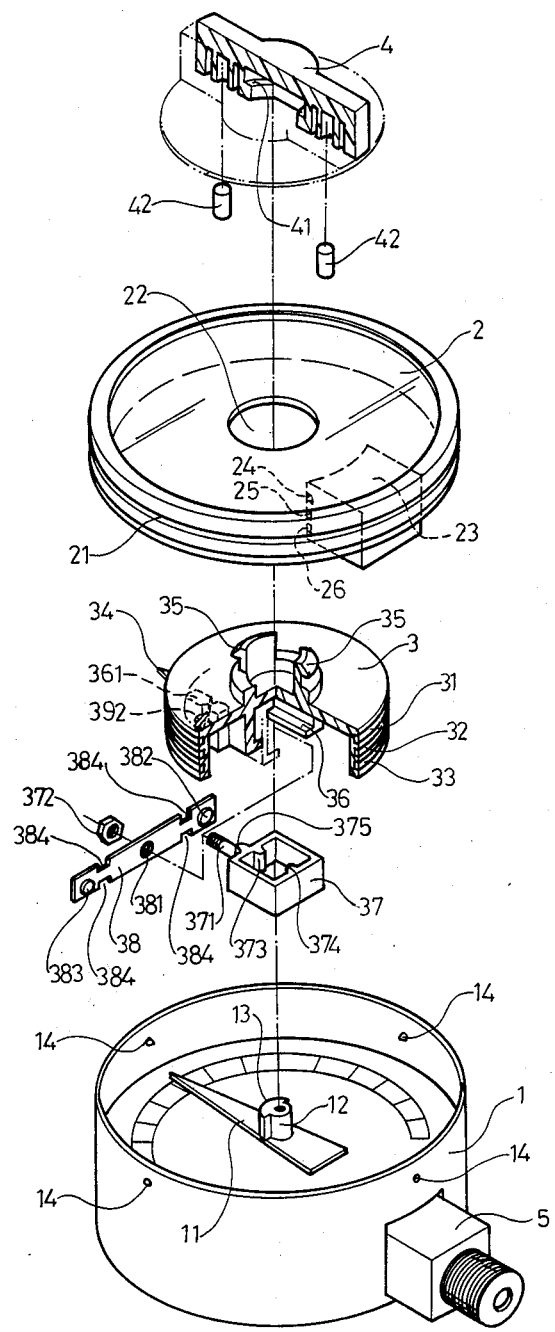
FIG. 1 is an exploded perspective view of the pressure gauge with an alarm device in accordance with the present invention.

This pressure gauge with an alarm device comprises a pressure gauge 1, a shell disc 2, a turning disc 3 and a turning button 4 as its main parts.

The pressure gauge 1 is the same as the common one in the structure, but additionally provided with a protruding wheel 12 set on the shaft of the needle 11. The protruding wheel 12 is formed with a smaller diametric portion and a fan-shaped portion of a larger diameter.

A round shell disc 2 made of a transparent material is provided with a circumferential groove 21 around its circumferential edge face, and said groove 21 is stuck in by inner protrusions 14 set on the inner circumferential wall of the pressure gauge 1 in assembling the shell disc 2 with the gauge 1, and whereby the pressure gauge 1 and the shell disc 2 can be combined together. The shell disc 2 has a round hole 22 for a turning disc 3 to be assembled with and to turn therein. A downwardly protruding seat 23 is provided at the bottom of the shell disc 2, and can contain three conducting wires coming out through three notches 24, 25, 26 in the seat 23 separately and contacting with three metal rings 31, 32, 33 of the turning disc 3 so that electricity can be conducted.

The turning disc 3 is provided with three metal rings 31, 32, 33, which keep contact respectively with the grooves 24, 25, 26 of the shell disc 2 for conducting electricity after said turning disc 3 is combined with the shell disc 2. Moreover, the metal rings 31, 32, 33 also contact respectively with contact points 391, 392 and a connecting metal piece 361 of a conducting metal piece 38. An alarming needle 34 is provided on the circumferential face of the turning disc 3 and can be turned to a desired location on the pressure graduation when said disc 3 turns in relation to the gauge 1.

In addition, the turning disc 3 is provided with two upwardly protruding hooks 35 on its end face, said hooks 35 being stuck in and combined with a ring-shaped groove 41 of the turning button 4 and able to expand and to shrink therein. And the turning button 4 can force the turning disc 3 to revolve by means of the oval form of the ring-shaped groove 41.

Besides, a downwardly protruding rail 36 is provided at the bottom of the turning disc 3, and can contain a sliding block 37 which can move straight. The sliding block 37 has a horizontally protruding bolt 371 to hold a conducting metal piece 38 with a nut 372, and is shaped as a square frame so as to sit and move on the rail 36 of the turning disc 3. The interior of the sliding block 37 is inserted by the protruding wheel 12 of the gauge needle 11 and said block 37 provided with a first protrusion 373 and a second protrusion 374 both extending inwardly and a third protrusion 375 extending outwardly from the wall beside the bolt 371. The first and the second protrusions 373 and 374 are to be touched and pressed by the fan-shaped portion 13 of the protruding wheel 12 so as to move the sliding block 37; the third protrusion 375 is able to press the conducting metal piece 38 to bend in the rightward direction when said block is moved rightward.

Figure 4:
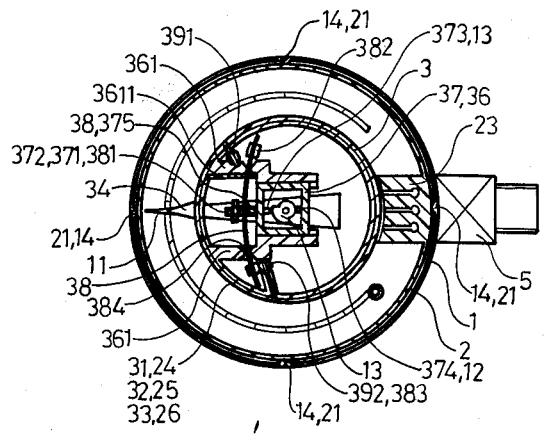
FIG. 4 is a cross-sectional view taken along line 4—4 of FIG. 3.
Figure 5:
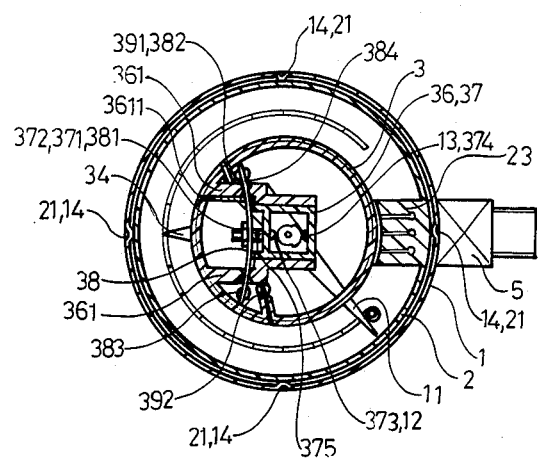
FIG. 5 is an actional view of the pressure gauge with an alarm device in accordance with the present invention.

The conducting metal piece 38 made of a conducting material has a central round hole 381 for the bolt 371 of the sliding block 37 to penetrate and to catch hold of said piece 38 together with the nut 372 screwed with the bolt 371, whereby the gap between said piece 38 and the third protrusion 375 or the bending space for said piece 38 can be changed. Said piece 38 is also provided with protruding points 382, 383 separately at both ends, said point 382 made to touch with the contact point 391 and said point 383 with the contact point 392 of the turning disc 3 as shown in FIGS. 4 and 5. Besides, said piece 38 is provided with four notches 384, two at the upside and two at the downside between the round hole 381 and the points 382, 383 for the two posts 361 of the rail 36 to stick at so that the piece 38 can bend by means of the two posts 361 as fulcrums. When the center of the piece 38 is pressed by the protrusion 375, the piece 38 bends with both ends move rightwardly so that the point 382 separates with the point 391 and the point 383 comes to touch with the point 392. But on the contrary, if the center of the piece 38 is pressed by the nut 372, said piece 38 bends leftward and the point 383 separates with the point 392 and the point 382 comes to touch with the point 391, as shown in FIG. 5.

The turning button 4 shown in FIG. 1 is provided with a ring-shaped groove 41 for the hooks 35 of the turning disc 3 to stick in and whereby said button 4 and said disc 3 are assembled together for mutual movement. Said button 4 is also provided with two protruding posts 42 at the bottom, and the posts 42 made of rubber rest on the flat face of the shell disc 2 such that the turning disc 3 can be revolved by said button 4 precisely and whereby the alarming needle 34 can also be revolved to point to a desired pressure at which the alarm is to be sounded.

Figure 2:
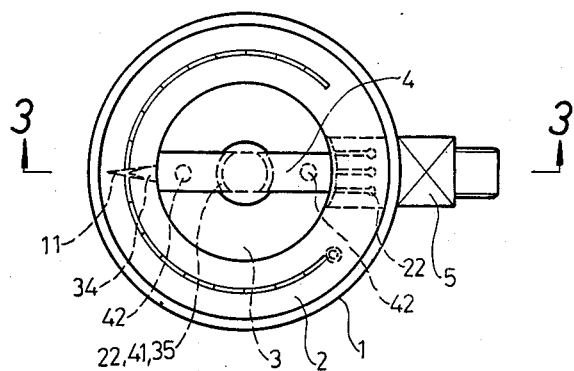
FIG. 2 is a top view of the pressure gauge with an alarm device in accordance with the present invention.
Figure 3:
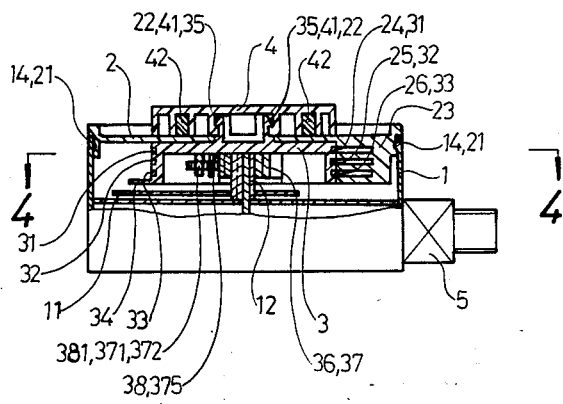
FIG. 3 is a cross-sectional view taken along line 3—3 of FIG. 2.

Referring to FIGS. 2, 3, 4, under the situation that the turning disc 3 is revolved by the turning button 4 to get the alarming needle 34 pointing to a designated pressure for alarming, if the needle 11 in the pressure gauge 1 comes to reach the designated pressure, the point 383 of the conducting metal piece 38 comes to contact with the point 392 of the turning disc 3 supplying electricity to start the alarm that the pressure has recahed the dangerous point. Because the piece 38 is pushed to bend rightwardly by the third protrusion 375 which is moved by the movement of the sliding block 37 by means of the pressing of the fan-shaped portion 13 of the protruding wheel 12 against the first protrusion 373. At the same time the point 382 separates from the point 391.

Next, referring to FIG. 5, if the pressure the needle 11 points to falls down and becomes less than that which the alarming needle 34 points to, the points 383 separates with the point 392 causing the electricity to the alarm cut off, because the piece 3 is pressed by the nut 372 owing to the retreating of the sliding block 37 whose second protrusion 375 is pressed by the fan-shaped portion 13 of the protruding wheel 2. Simultaneously the point 382 comes to contact with the point 391 causing the electricity to close for some action else.

Figure 6:
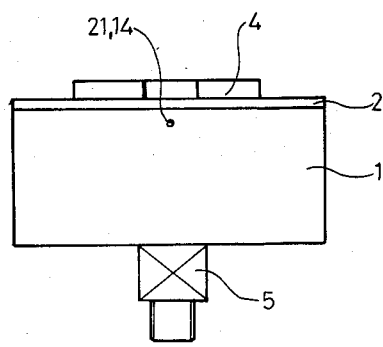
FIG. 6 is another example of the pressure gauge with an alarm device in accordance with the present invention.

Another example of this invention shown in Fig. 6 has the valve 5 fixed at the bottom of the pressure gauge 1 instead of at the side, but there is no difference in its action.

What is claimed is:

1. A pressure gauge with an alarm comprising:

a pressure gauge having an indicating needle mounted on a needle shaft and a protruding wheel with a fanshaped portion mounted on the needle shaft;

a shell disc provided with a circumferential groove for combining with the pressure gauge and with a central round hole for combining with a turning button and a turning disc, said turning disc being able to be revolved by said button and provided with a rail at the bottom for a sliding block to move straight thereon and a contact point;

said sliding block being a square frame having a first protrusion and a second protrusion inside said block and a third protrusion outside said block, with said block being inserted onto the protruding wheel so that the first and the second protrusions can be pressed by the fanshaped portion of the protruding wheel when the needle of the gauge revolves;

said sliding block provided with a bolt and a nut to connect a conduction metal piece at its center onto said third protrusion, said metal piece having a left and a right contact point respectively at each end;

wherein revolving said turning button causes said turning disc to revolve and point to a designated pressure for starting said alarm;

said first protrusion of said sliding block being pushed by said fan-shaped portion of the protruding wheel when the needle of the gauge points to said designated pressure, causing said sliding block to move rightward;

the subsequent rightward movement of the third protrusion of the sliding block forcing said metal piece to bend rightward, making the left contact point of said metal piece contact with the contact point of said turning disc to start said alarm; and wherein when the pressure which said needle points to falls below said designated pressure, said fan-shaped portion of said protruding wheel pushes the second protrusion, causing the nut of said sliding block attached to said third protrusion to bend said metal piece leftward, thus separating said left contact point from the contact point of the turning disc, cutting off the electricity to stop said alarm.

* * * * *